US011242466B2

(12) United States Patent
Egawa et al.

(10) Patent No.: US 11,242,466 B2

(45) Date of Patent: Feb. 8, 2022

(54) INK SET FOR INKJET RECORDING

(71) Applicant: KAO CORPORATION, Tokyo (JP)

(72) Inventors: Tsuyoshi Egawa, Izumiotsu (JP); Kaname Mitsuyoshi, Kinokawa (JP); Tomohiko Nagano, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/756,084

(22) PCT Filed: Oct. 15, 2018

(86) PCT No.: PCT/JP2018/038295

§ 371 (c)(1),
(2) Date: Apr. 14, 2020

(87) PCT Pub. No.: WO2019/078150

PCT Pub. Date: Apr. 25, 2019

(65) Prior Publication Data

US 2020/0255683 A1 Aug. 13, 2020

(30) Foreign Application Priority Data

Oct. 16, 2017 (JP) ............................ JP2017-200637

(51) Int. Cl.

| | |
|---|---|
| ***C09D 11/40*** | (2014.01) |
| ***B41M 5/00*** | (2006.01) |
| ***C09D 11/108*** | (2014.01) |
| ***C09D 11/322*** | (2014.01) |
| ***B41J 2/21*** | (2006.01) |

(52) U.S. Cl.

CPC ............ *C09D 11/40* (2013.01); *B41J 2/2107* (2013.01); *B41M 5/0023* (2013.01); *C09D 11/108* (2013.01); *C09D 11/322* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 11/0021; B41J 11/002; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 2/04588; B41J 2/04595; B41J 2/04586; B41J 2/14274; C09D 11/07; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| | | | | |
|---|---|---|---|---|
| 6,538,047 | B1 | 3/2003 | Miyabayashi | |
| 6,923,854 | B2 * | 8/2005 | Taguchi ................ | C09D 11/40 106/31.43 |
| 2003/0097961 | A1 | 5/2003 | Yatake et al. | |
| 2006/0189713 | A1 | 8/2006 | Herrmann et al. | |
| 2007/0266890 | A1 * | 11/2007 | Taguchi ................ | C09D 11/40 106/31.47 |
| 2008/0165237 | A1 | 7/2008 | Yamauchi et al. | |
| 2009/0035468 | A1 * | 2/2009 | Matsuyama .......... | C09D 11/40 427/256 |
| 2010/0022700 | A1 | 1/2010 | Shibatani et al. | |
| 2011/0102529 | A1 | 5/2011 | Yoshida et al. | |
| 2013/0342620 | A1 * | 12/2013 | Fujie ................... | C09D 11/328 347/100 |
| 2014/0066550 | A1 | 3/2014 | Shigemori et al. | |
| 2015/0118494 | A1 | 4/2015 | Vilner et al. | |
| 2015/0291819 | A1 * | 10/2015 | Mizutani ............. | C09D 11/322 428/207 |
| 2019/0284410 | A1 | 9/2019 | Azuma et al. | |

FOREIGN PATENT DOCUMENTS

| | | | |
|---|---|---|---|
| CN | 101245205 | A | 8/2008 |
| CN | 104470992 | A | 3/2015 |
| EP | 2105476 | A2 | 9/2009 |
| EP | 2623567 | A1 | 8/2013 |
| EP | 2865531 | A1 | 4/2015 |
| EP | 3447098 | A1 | 2/2019 |
| JP | 11-152424 | A | 6/1999 |
| JP | 2002-161223 | A | 6/2002 |
| JP | 2006-225654 | A | 8/2006 |
| JP | 2007-91909 | A | 4/2007 |
| JP | 2007-98661 | A | 4/2007 |
| JP | 2010-43149 | A | 2/2010 |
| JP | 2010-168579 | A | 8/2010 |
| JP | 3169526 | U | 8/2011 |

(Continued)

OTHER PUBLICATIONS

International Search Report for PCT/JP2018/038295 (PCT/ISA/210) dated Jan. 8, 2019.

(Continued)

*Primary Examiner* — Manish S Shah

(74) *Attorney, Agent, or Firm* — Birch, Stewart, Kolasch & Birch, LLP

(57) ABSTRACT

The present invention relates to an ink set for ink-jet printing which contains at least a water-based ink (I) and a water-based ink (II) in which the water-based ink (I) contains a pigment (A1) having a barbituric acid-derived structure, and the water-based ink (II) contains a diketopyrrolopyrrole pigment (A2), an ink-jet printing method using the ink set, and an ink-jet printed material.

18 Claims, No Drawings

(56) References Cited

FOREIGN PATENT DOCUMENTS

| | | | |
|---|---|---|---|
| JP | 2012-201710 | A | 10/2012 |
| JP | 2014-205767 | A | 10/2014 |
| JP | 2017-119845 | A | 7/2017 |
| JP | 2017-155092 | A | 9/2017 |
| JP | 2018-109095 | A | 7/2018 |
| WO | WO 01/94482 | A1 | 12/2001 |
| WO | WO 2006/129476 | A1 | 12/2006 |
| WO | WO 2009/025287 | A1 | 2/2009 |
| WO | WO 2014/155842 | A1 | 10/2014 |
| WO | WO 2016/066531 | A1 | 5/2016 |

OTHER PUBLICATIONS

U.S. Appl. No. 16/756,037, filed Apr. 14, 2020.
International Search Report for International Application PCT/JP2018/038296, dated Dec. 11, 2018, with English translation.
Extended European Search Report, dated Jul. 2, 2021, for European Application No. 18868080.5.
Extended European Search Report for European Application No. 18867470.9, dated Jun. 18, 2021.
Gong et al., "Nomenclature of Organic Compounds," Higher Education Press, 1982, 4 pages total.

* cited by examiner

INK SET FOR INKJET RECORDING

FIELD OF THE INVENTION

The present invention relates to an ink set for ink-jet printing, an ink-jet printing method using the ink set, and an ink-jet printed material.

BACKGROUND OF THE INVENTION

In ink-jet printing methods, droplets of ink are directly ejected onto a printing medium from very fine nozzles and allowed to adhere to the printing medium to obtain a printed material on which printed characters or images are formed. The ink-jet printing methods have now been used not only in printing applications for ordinary consumers, but also recently in commercial and industrial printing applications, because of various advantages such as easiness of full coloration, low cost, capability of using a plain paper as the printing medium, non-contact with the printed characters or images, etc.

On the other hand, it has also been required to print characters or images on a low-water absorbing printing medium such as an art paper, a coated paper, etc., or a non-water absorbing printing medium for commercial printing purposes using a synthetic resin film such as a polyvinyl chloride resin film, a polypropylene resin film, a polyester resin film, etc.

For example, JP 2014-205767A (Patent Literature 1) discloses an aqueous ink-jet ink set as an ink for ink-jet printing which is excellent in printability on a low-water absorbing substrate such as a coated paper, an art paper or a polyvinyl chloride sheet, etc., and is constituted of a cyan ink, a magenta ink and a yellow ink each containing at least a pigment, an organic solvent and water, in which the organic solvent includes a water-soluble organic solvent having a specific boiling point. In the Patent Literature 1, it is also described that the magenta ink contains a quinacridone pigment such as C.I. Pigment Red 122, etc., and the yellow ink contains at least one pigment selected from the group consisting of C.I. Pigment Yellow 120, C.I. Pigment Yellow 150 and C.I. Pigment Yellow 155.

JP 2006-225654A (Patent Literature 2) discloses an aqueous pigment blended mixture for ink-jet printing which is capable of exhibiting high color clarity, and contains a pigment, a copolymerized polymeric carboxylic acid, a nonionic or anionic surfactant, etc. In Examples of the Patent Literature 2, it is also described that individual pigment inks such as a yellow ink and a magenta ink were used singly for the printing, and further the printing was conducted by using an ink containing C.I. Pigment Yellow 74 and an ink containing C.I. Pigment Red 122, or by using a mixed ink that is constituted of an ink containing C.I. Pigment Red 254 and an ink containing C.I. Pigment Red 122 in combination with an ink containing C.I. Pigment Yellow 74.

JP 2007-98661A (Patent Literature 3) discloses an ink used in an ink unit having improved ink ejection accuracy, which contains a water-insoluble colorant, a water-soluble organic solvent, a polymer dispersant that is constituted of a block copolymer containing at least one hydrophobic block and at least one hydrophilic block, and water. In Examples of the Patent Literature 3, it is also described that the respective pigment inks were used singly for the printing.

SUMMARY OF THE INVENTION

The present invention relates to an ink set for ink-jet printing, containing at least a water-based ink (I) and a water-based ink (II), in which:

the water-based ink (I) contains a pigment (A1) having a barbituric acid-derived structure; and the water-based ink (II) contains a diketopyrrolopyrrole pigment (A2).

DETAILED DESCRIPTION OF THE INVENTION

The printed materials using a non-water absorbing or low-water absorbing printing medium such as an art paper, a coated paper, etc., as well as a synthetic resin film have been often used in the outdoor applications such as outdoor advertisements. In the outdoor applications, the printed materials have been required to have a less change in hue owing to light, heat, humidity, etc., namely exhibit excellent weathering resistance.

It is known that the quinacridone pigments such as C.I. Pigment Red 122, etc., as used in the Patent Literatures 1 and 2 are excellent in weathering resistance. However, when an image region exhibiting a single hue is formed by using C.I. Pigment Red 122 as a magenta-based pigment in combination with a yellow pigment, there tends to sometimes occur such a problem that the image region containing both the pigments is insufficient in weathering resistance. The technologies described in the Patent Literatures 1 to 3 have failed to sufficiently suppress the change in hue of the image region containing a red-based pigment such as a magenta pigment, a red pigment and an orange pigment, and a yellow pigment, when used in the outdoor applications. Therefore, it has been required to provide the technologies for suppressing the change in hue of such an image region.

The present invention relates to an ink set for ink-jet printing which is capable of providing a printed material that exhibits a less change in hue of an image region containing a red-based pigment and a yellow pigment and is excellent in weathering resistance even when used in the outdoor applications, an ink-jet printing method using the ink set, and an ink-jet printed material.

Meanwhile, the term "low-water absorbing" as used in the present specification means a concept including both of "low-water absorbing properties" and "non-water absorbing properties", more specifically, means that the water absorption of a printing medium as measured by contacting the printing medium with pure water for 100 milliseconds is not less than 0 $g/m^2$ and not more than 10 $g/m^2$.

In addition, the term "image-forming" as used herein means a concept that includes printing or typing for forming characters or images, and the term "printed material" as used herein means a concept that includes printed matters or typed materials on which the characters or images are formed.

The present inventors have found that by using an ink set for ink-jet printing which contains a combination of inks each containing a pigment having a specific structure by conducting an ink-jet printing method using the ink set, it is possible to obtain a printed material that exhibits a less change in hue of an image region containing a red-based pigment and a yellow pigment and is excellent in weathering resistance even when used in the outdoor applications.

That is, the present invention relates to the following aspects [1] to [3].

[1] An ink set for ink-jet printing, containing at least a water-based ink (I) and a water-based ink (II), in which:

the water-based ink (I) contains a pigment (A1) having a barbituric acid-derived structure; and the water-based ink (II) contains a diketopyrrolopyrrole pigment (A2).

[2] An ink-jet printing method in which the ink set for ink-jet printing according to the above aspect [1] is loaded to an ink-jet printing apparatus to form characters or images on a printing medium by a process including the following steps 1 and 2:

Step 1: ejecting one of the water-based ink (I) and the water-based ink (II) onto the printing medium; and Step 2: further ejecting the other of the water-based ink (I) and the water-based ink (II) onto the one of the water-based ink (I) and the water-based ink (II) previously ejected onto the printing medium in the step 1, in an overlapped manner.

[3] An ink-jet printed material including characters or images formed on a printing medium, in which an image region exhibiting a single hue in the images contains a pigment (A1) having a barbituric acid-derived structure and a diketopyrrolopyrrole pigment (A2).

In accordance with the present invention, it is possible to provide an ink set for ink-jet printing which is capable of providing a printed material that exhibits a less change in hue of an image region containing a red-based pigment and a yellow pigment and is excellent in weathering resistance even when used in the outdoor applications, an ink-jet printing method using the ink set, and an ink-jet printed material.

[Ink Set for Ink-Jet Printing]

The ink set for ink-jet printing according to the present invention (hereinafter also referred to merely as an "ink set") contains at least a water-based ink (I) (hereinafter also referred to merely as an "ink (I)") and a water-based ink (II) (hereinafter also referred to merely as an "ink (II)"), in which the ink (I) contains a pigment (A1) having a barbituric acid-derived structure, and the ink (II) contains a diketopyrrolopyrrole pigment (A2).

The ink set of the present invention is used as an ink for ink-jet printing for forming characters or images including an image region that contains the pigment (A1) having a barbituric acid-derived structure and the diketopyrrolopyrrole pigment (A2) and exhibits a single hue. The characters or images formed by the ink-jet printing method using the ink set may be those including at least partially an image region that contains the pigment (A1) having a barbituric acid-derived structure and the diketopyrrolopyrrole pigment (A2) and exhibits a single hue, and they may also include such an image region as formed by the ink (I) only or such an image region as formed by the ink (II) only. Furthermore, in the case where the ink set contains the other water-based ink than the ink (I) and the ink (II), the characters or images formed by using the ink set may also include an image region formed by the other water-based ink only.

Meanwhile, the term "water-based" as used in the present specification means that water has a largest content among components of a dispersing medium contained in the ink.

The reason why the ink set of the present invention in which the water-based ink containing the pigment having a barbituric acid-derived structure is used in combination with the water-based ink containing the diketopyrrolopyrrole pigment is capable of providing a printed material that exhibits a less change in hue of an image region containing the red-based pigment and the yellow pigment and is excellent in weathering resistance even when used in the outdoor applications is considered as follows though it is not clearly determined yet.

That is, the barbituric acid-derived structure includes a six-membered ring containing an amide bond at a part thereof, and the diketopyrrolopyrrole pigment includes a five-membered ring containing an amide bond at a part thereof. For this reason, it is considered that the pigments used in combination with each other can exhibit a stabilized electron state by similarity of their structures and an electrostatic interaction therebetween such as hydrogen bond between molecules thereof owing to molecular structures of the respective pigments, and when thus using the pigments in combination with each other, rather than using the respective pigments solely, it becomes possible to suppress a change in hue of the image region owing to light, heat, humidity, etc.

<Pigment>

[Pigment (A1)]

The water-based ink (I) contains the pigment (A1) having a barbituric acid-derived structure.

The pigment (A1) is a yellow pigment. Specific examples of the pigment (A1) include yellow pigments whose colors are classified into Yellow in color index classification, such as C.I. Pigment Yellow 150, C.I. Pigment Yellow 139, C.I. Pigment Yellow 185, etc. Among these pigments, from the viewpoint of improving weathering resistance of the resulting printed material, preferred are an azobarbituric acid metal complex represented by the following general formula (1) which has a barbituric acid-derived structure including a bonding site with an azo group, or a tautomer thereof. The tautomer of the azobarbituric acid metal complex has an azomethine group-containing structure.

(1)

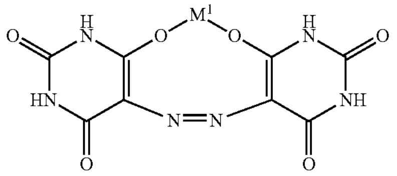

In the general formula (1), $M^1$ is a divalent or trivalent ion of a metal such as Fe, Co, Ni, Zn, etc. These metals ions may be used alone or in combination of any two or more thereof as long as they can exhibit a hue of yellow. Specific examples of the metal ions include divalent or trivalent metal ions such as $Fe^{2+}$, $Fe^{3+}{}_{2/3}$, $Co^{2+}$, $Co^{3+}{}_{2/3}$, $Ni^{2+}$, $Zn^{2+}$, etc.

Among these pigments, more preferred is C.I. Pigment Yellow 150 (hereinafter also referred to merely as "PY150") in the form of an azobarbituric acid nickel complex pigment having a structure formed by crosslinking two barbituric acid molecules with an azo group. PY150 is, for example, in the form of a metal complex pigment represented by the following formula (1-1) or a tautomer thereof.

(1-1)

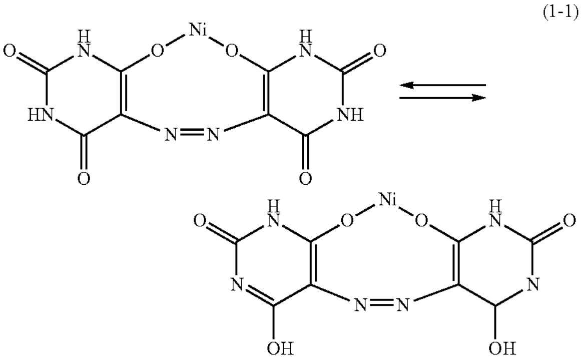

Examples of commercially available products of the pigment (A1) include "Levascreen Yellow G03", "Levascreen Yellow G04", "Levascreen Yellow G05" and "BAYSCRIPT Yellow 4GF" (tradenames) all available from LANXESS AG; and "Paliotol Yellow D" series products available from BASF AG, such as "Paliotol Yellow D 1155" and "Paliotol Yellow D 1819", etc.

Meanwhile, these pigments (A1) may be used alone or in combination of any two or more thereof.

The ink (I) may also contain the other pigments than the pigment (A1) unless the advantageous effects of the present invention are adversely affected thereby. The content of the pigment (A1) in the pigments contained in the ink (I) is preferably not less than 70% by mass, more preferably not less than 80% by mass, even more preferably not less than 90% by mass and further even more preferably not less than 95% by mass, and is also preferably not more than 100% by mass.

[Pigment (A2)]

The water-based ink (II) contains the diketopyrrolopyrrole pigment (A2) (hereinafter also referred to merely as a "pigment (A2)"). The pigment (A2) is preferably in the form of a compound represented by the following general formula (2).

(2)

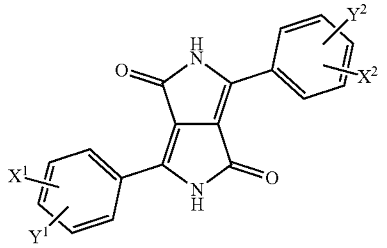

In the general formula (2), $X^1$ and $X^2$ are each independently a hydrogen atom or a halogen atom; $Y^1$ and $Y^2$ are each independently a hydrogen atom, a —$SO_3H$ group, a —COOH group, a hydrocarbon group or a —CN group.

In the aforementioned formula (2), $X^1$ and $X^2$ are each preferably a halogen atom. Examples of the halogen atom include a fluorine atom, a chlorine atom, etc.

Examples of the hydrocarbon group as $Y^1$ and $Y^2$ in the aforementioned formula (2) include a saturated hydrocarbon group, an unsaturated hydrocarbon group, an alicyclic hydrocarbon group, an aromatic hydrocarbon group, etc.

The pigment (A2) is a red-based pigment whose color is classified into magenta, red and orange in color index classification. Specific examples of the pigment (A2) include C.I. Pigment Red 254, C.I. Pigment Red 255, C.I. Pigment Red 264, C.I. Pigment Orange 71, C.I. Pigment Orange 73, etc. Among these pigments, from the viewpoint of improving weathering resistance of the resulting printed material, preferred is C.I. Pigment Red 254 as the compound of the formula (2) in which $X^1$ and $X^2$ are each a chlorine atom, and $Y^1$ and $Y^2$ are each a hydrogen atom (hereinafter also referred to merely as "PR254").

Examples of commercially available products of the diketopyrrolopyrrole pigment (A2) include "FASTOGEN Super Red 254" series products such as "FASTOGEN Super Red 254 226-0200" and "FASTOGEN Super Red 254 226-5254" (tradenames) all available from DIC Corporation; as well as "Irgazin Red" series products such as "Irgazin Red D 3656 HD", "Irgazin Red K 3840", "Irgazin Red D 3842", "Irgazin Red K 3845", "Irgazin Red L 3551 HD", "Irgazin Red L 3630", "Irgazin Red L 3660 HD", "Irgazin Red L 3661 HD" and "Irgazin Red L 3670 HD"; "Irgazin Rubine" series products such as "Irgazin Rubine K 4085", "Irgazin Rubine L 4025" and "Irgazin Rubine L 4030"; "Irgazin Scarlet L 3550 HD"; and "Irgazin Orange" series products such as "Irgazin Orange D 2905", "Irgazin Orange K 2910", "Irgazin Orange K 2990", "Irgazin Orange L 2990 HD" and "Irgazin Orange L 2999 HD" (tradenames) all available from BASF AG; and the like.

Meanwhile, these pigments (A2) may be used alone or in combination of any two or more thereof.

The combination of the pigment (A1) and the pigment (A2) is preferably a combination of the azobarbituric acid metal complex represented by the aforementioned formula (1) or a tautomer thereof as the pigment (A1) and the compound represented by the aforementioned formula (2) as the pigment (A2), more preferably a combination of PY150 as the pigment (A1) and the compound represented by the aforementioned formula (2) as the pigment (A2), and even more preferably a combination of PY150 as the pigment (A1) and PR254 as the pigment (A2). The azobarbituric acid metal complex represented by the aforementioned formula (1) or a tautomer thereof has such a structure that a double bond is further introduced into a barbituric acid-derived heterocyclic ring. For this reason, delocalization of electrons in the barbituric acid-derived heterocyclic ring is promoted, and the interaction between the pigment (A1) and the pigment (A2) becomes stronger, so that the electron state of these pigments is more stabilized. As a result, it is considered that the resulting printed material can be prevented from suffering from undesirable change in hue owing to light, heat, humidity, etc.

The ink (II) may also contain the other pigments than the pigment (A2) unless the advantageous effects of the present invention are adversely affected thereby. The content of the pigment (A2) in the pigments contained in the ink (II) is preferably not less than 70% by mass, more preferably not less than 80% by mass, even more preferably not less than 90% by mass and further even more preferably not less than 95% by mass, and is also preferably not more than 100% by mass.

<Polymer (B)>

At least one of the ink (I) and the ink (II) preferably further contains a polymer (B) from the viewpoint of well dispersing the pigment and/or improving fixing properties of the inks onto a printing medium. At least one of the pigment (A1) and the pigment (A2) is preferably dispersed in the respective inks with the polymer (B), and it is more preferred that the pigment (A1) and the pigment (A2) are dispersed in the ink (I) and the ink (II), respectively, with the polymer (B).

Examples of the polymer (B) include condensation-based polymers such as polyesters, polyurethanes, etc.; vinyl-based polymers; and the like. In addition, commercially available dispersion liquids of polymer particles may also be used.

Examples of the commercially available dispersion liquids of polymer particles include those dispersion liquids of particles formed of acrylic resins, styrene-based resins, urethane-based resins, polyester-based resins, styrene-acrylic resins, butadiene-based resins, styrene-butadiene-based resins, vinyl chloride-based resins, vinyl acetate-based resins, acrylic silicone-based resins, etc. Among these dispersion liquids, preferred are those dispersion liquids of particles formed of acrylic resins, urethane resins, styrene-butadiene-based resins, styrene-acrylic resins or vinyl chloride-based resins. Specific examples of the commercially available dispersion liquids of polymer particles include dispersion liquids of polymer particles formed of acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR-102" both available from Nippon A & L Inc.; styrene-acrylic resins such as "JONCRYL 7100", "JONCRYL 734" and "JONCRYL 538" all available from BASF Japan, Ltd.; vinyl chloride-based resins such as "VINYBLAN 701" available from Nissin Chemical Industry Co., Ltd.; and the like.

The polymer (B) is preferably a vinyl-based polymer obtained by addition-polymerizing a vinyl monomer (such as a vinyl compound, a vinylidene compound and a vinylene compound) from the viewpoint of improving weathering resistance of the resulting printed material. The vinyl-based polymer is preferably an aromatic group-containing polymer, and more preferably contains a constitutional unit derived from an aromatic group-containing monomer (b-1) (hereinafter also referred to merely as a "monomer (b-1)") and a constitutional unit derived from an ionic functional group-containing monomer (b-2) (hereinafter also referred to merely as a "monomer (b-2)"). The polymer (B) may be produced by subjecting a monomer mixture containing the monomer (b-1) and the monomer (b-2) (hereinafter also referred to merely as a "monomer mixture") to copolymerization.

[Aromatic Group-Containing Monomer (b-1)]

The monomer (b-1) is preferably used as a monomer component of the polymer (B) from the viewpoint of improving weathering resistance of the resulting printed material. The monomer (b-1) is preferably a vinyl monomer containing an aromatic group having not less than 6 and not more than 22 carbon atoms which may also contain a substituent group containing a hetero atom, and more preferably at least one monomer selected from the group consisting of a styrene-based monomer, an aromatic group-containing (meth)acrylic acid ester and an aromatic group-containing macromonomer.

The molecular weight of each of the styrene-based monomer and the aromatic group-containing (meth)acrylic acid ester is preferably less than 500.

Examples of the styrene-based monomer include styrene, 2-methyl styrene, α-methyl styrene and divinyl benzene. Among these styrene-based monomers, preferred are styrene and α-methyl styrene.

Examples of the aromatic group-containing (meth)acrylic acid ester include benzyl (meth)acrylate, phenoxyethyl (meth)acrylate, etc. Among these aromatic group-containing (meth)acrylic acid esters, preferred is benzyl (meth)acrylate.

The aforementioned monomers (b-1) may be used alone or in combination of any two or more thereof.

Meanwhile, the term "(meth)acrylic acid" as used in the present specification means at least one compound selected from the group consisting of acrylic acid and methacrylic acid, the term "(meth)acrylate" as used herein means at least one compound selected from the group consisting of an acrylate and a methacrylate, and these terms are also hereinafter defined in the same way.

The aromatic group-containing macromonomer is in the form of a compound containing a polymerizable functional group at one terminal end thereof and having a number-average molecular weight of not less than 500 and not more than 100,000. The polymerizable functional group bonded to one terminal end of the macromonomer is preferably an acryloyloxy group or a methacryloyloxy group and more preferably a methacryloyloxy group.

The number-average molecular weight of the aromatic group-containing macromonomer is preferably not less than 1,000 and not more than 10,000. Meanwhile, the number-average molecular weight may be measured by gel permeation chromatography using chloroform containing 1 mmol/L of dodecyl dimethylamine as a solvent and using monodisperse polystyrenes having known molecular weights as a reference standard substance.

Examples of an aromatic group-containing monomer constituting the aromatic group-containing macromonomer include the styrene-based monomer and the aromatic group-containing (meth)acrylic acid ester which are used as the aforementioned monomer (b-1), etc. Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

The monomer (b-1) is preferably the styrene-based monomer, more preferably at least one monomer selected from the group consisting of styrene, 2-methyl styrene, a-methyl styrene and divinyl benzene, even more preferably at least one monomer selected from the group consisting of styrene and α-methyl styrene, and further even more preferably a combination of styrene and α-methyl styrene.

[Ionic Functional Group-Containing Monomer (b-2)]

Examples of the monomer (b-2) include a cationic group-containing monomer and an anionic group-containing monomer. Among these monomers, from the viewpoint of improving dispersibility of the pigment as well as from the viewpoint of improving weathering resistance of the resulting printed material, preferred is an anionic group-containing monomer. Examples of the anionic group include groups that are capable of releasing hydrogen ions upon dissociation thereof to allow the monomer to exhibit acidity, such as a carboxy group ($-COOM^2$), a sulfonic acid group ($-SO_3M^2$), a phosphoric acid group ($-OPO_3M^2_2$), etc., and dissociated ion forms of these groups (such as $-COO^-$, $-SO_3^-$, $-OPO_3^{2-}$ and $-OPO_3^-M^2$), etc. In the aforementioned chemical formulae, $M^2$ is a hydrogen atom, an alkali metal, ammonium or an organic ammonium.

Examples of the carboxy group-containing monomer include (meth)acrylic acid, crotonic acid, itaconic acid, maleic acid, fumaric acid, citraconic acid, 2-methacryloyloxymethylsuccinic acid, etc.

Examples of the sulfonic acid group-containing monomer include styrenesulfonic acid, 2-acrylamido-2-methylpropanesulfonic acid, 3-sulfopropyl (meth)acrylate, etc.

Examples of the phosphoric acid group-containing monomer include vinylphosphonic acid, vinyl phosphate, bis (methacryloxyethyl) phosphate, diphenyl-2-acryloyloxyethyl phosphate, diphenyl-2-methacryloyloxyethyl phosphate, etc.

The monomer (b-2) is preferably the anionic group-containing monomer, more preferably the carboxy group-containing monomer, even more preferably at least one monomer selected from the group consisting of (meth) acrylic acid, crotonic acid, itaconic acid, maleic acid, fumaric acid, citraconic acid and 2-methacryloyloxymethylsuccinic acid, and further even more preferably (meth) acrylic acid.

The polymer (B) may further contain a constitutional unit derived from the other monomer than the monomers (b-1) and (b-2) unless the advantageous effects of the present invention are adversely affected thereby. Examples of the other monomer include (meth)acrylic acid alkyl esters such as methyl (meth)acrylate, ethyl (meth)acrylate, (iso)propyl (meth)acrylate, (iso- or tert-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth) acrylate, (iso)dodecyl (meth)acrylate, (iso)stearyl (meth) acrylate, etc.; hydroxyalkyl (meth)acrylates such as 2-hydroxyethyl (meth)acrylate, 3-hydroxypropyl (meth)acrylate, etc.; polyalkylene glycol (meth)acrylates such as polyethylene glycol (n=2 to 30 wherein n represents an average molar number of addition of oxyalkylene groups: hereinafter defined in the same way) (meth)acrylate, polypropylene glycol (n=2 to 30) (meth)acrylate, etc.; alkoxy polyalkylene glycol (meth)acrylates such as methoxy polyethylene glycol (n=1 to 30) (meth)acrylate, etc.; phenoxy (ethylene glycol/ propylene glycol copolymer) (n=1 to 30 in which n for ethylene glycol is 1 to 29) (meth)acrylate; and the like.

Meanwhile, the terms "(iso- or tert-)" and "(iso)" as used in the present specification mean both of the structure in which any of these prefixes is present, and the structure in which none of these prefixes is present (i.e., the latter structure represents a "normal" state).

The aromatic group-containing polymer used as the polymer (B) is preferably in the form of an anionic water-insoluble polymer containing a constitutional unit derived from at least one monomer selected from the group consisting of a styrene-based monomer, an aromatic group-containing (meth)acrylic acid ester and an aromatic group-containing macromonomer as the aromatic group-containing monomer (b-1), and a constitutional unit derived from an anionic group-containing monomer as the ionic functional group-containing monomer (b-2) from the viewpoint of improving weathering resistance of the resulting printed material.

The term "water-insoluble" of the aforementioned water-insoluble polymer as used in the present specification means that when the polymer is dried to a constant weight at 105° C. for 2 hours and then dissolved in 100 g of water at 25° C. until reaching a saturation concentration thereof, the solubility in water of the polymer is less than 10 g. The solubility in water of the polymer is preferably not more than 5 g and more preferably not more than 1 g. The aforementioned solubility means a solubility in water of the anionic water-insoluble polymer whose anionic groups are neutralized completely (i.e., 100%) with sodium hydroxide.

The total content of the constitutional unit derived from the monomer (b-1) and the constitutional unit derived from the monomer (b-2) in the polymer (B) is preferably not less than 80% by mass, more preferably not less than 90% by mass, even more preferably not less than 95% by mass and further even more preferably 100% by mass from the viewpoint of improving weathering resistance of the resulting printed material.

(Contents of Respective Monomers in Monomer Mixture or Contents of Respective Constitutional Units in Polymer (B))

The contents of the monomer (b-1) and the monomer (b-2) in the monomer mixture (contents of non-neutralized components; hereinafter defined in the same way) upon production of the polymer (B), or the contents of the constitutional units derived from the monomer (b-1) and the monomer (b-2) in the polymer (B) are as follows, from the viewpoint of improving weathering resistance of the resulting printed material.

The content of the monomer (b-1) is preferably not less than 10% by mass, more preferably not less than 20% by mass, even more preferably not less than 30% by mass, further even more preferably not less than 40% by mass, still further even more preferably not less than 50% by mass and furthermore preferably not less than 55% by mass, and is also preferably not more than 90% by mass, more preferably not more than 80% by mass, even more preferably not more than 70% by mass and further even more preferably not more than 60% by mass.

The content of the monomer (b-2) is preferably not less than 10% by mass, more preferably not less than 20% by mass, even more preferably not less than 30% by mass and further even more preferably not less than 40% by mass, and is also preferably not more than 90% by mass, more preferably not more than 80% by mass, even more preferably not more than 70% by mass, further even more preferably not more than 60% by mass, still further even more preferably not more than 50% by mass and furthermore preferably not more than 45% by mass.

The mass ratio of the monomer (b-1) to the monomer (b-2) [(b-1)/(b-2)] is preferably not less than 0.5, more preferably not less than 0.7, even more preferably not less than 1.0 and further even more preferably not less than 1.3, and is also preferably not more than 2.0, more preferably not more than 1.7 and even more preferably not more than 1.5.

(Production of Polymer (B))

The polymer (B) may be produced by copolymerizing the aforementioned monomer mixture by conventionally known polymerization methods such as a bulk polymerization method, a solution polymerization method, a suspension polymerization method, an emulsion polymerization method, etc. Among these polymerization methods, preferred is the solution polymerization method.

The solvent used in the solution polymerization method is not particularly limited, and is preferably an organic polar solvent such as aliphatic alcohols having not less than 1 and not more than 3 carbon atoms, ketones, ethers and esters. Specific examples of the organic polar solvent include methanol, ethanol, acetone and methyl ethyl ketone. Among these organic polar solvents, preferred is methyl ethyl ketone.

The polymerization may be carried out in the presence of a polymerization initiator or a polymerization chain transfer agent. As the polymerization initiator, preferred is an azo compound, and more preferred is 2,2'-azobis(2,4-dimethylvaleronitrile). As the polymerization chain transfer agent, preferred are mercaptans, and more preferred is 2-mercaptoethanol.

The preferred polymerization conditions may vary depending upon the kind of polymerization initiator used, etc. However, the polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or in an atmosphere of an inert gas such as argon.

After completion of the polymerization reaction, the polymer produced may be isolated from the obtained reaction solution by known methods such as reprecipitation, removal of the solvent by distillation, etc. In addition, the resulting polymer may be subjected to reprecipitation, membrane separation, chromatography, extraction, etc., to remove unreacted monomers, etc., from the reaction solution.

From the viewpoint of enhancing productivity of the below-mentioned water dispersion of the pigment-containing polymer particles, the obtained polymer (B) is preferably used as such in the form of a polymer (B) solution without removing the solvent used in the aforementioned polymerization reaction therefrom (for example, the aforementioned organic solvent in the case where the polymer (B) is produced by the solution polymerization method) in order to use the organic solvent contained in the polymer solution as an organic solvent used in the below-mentioned step (i).

The number-average molecular weight of the polymer (B) used in the present invention is preferably not less than 3,000, more preferably not less than 5,000 and even more preferably not more than 7,000, and is also preferably not more than 100,000, more preferably not more than 70,000, even more preferably not more than 50,000, further even more preferably not more than 30,000 and still further even more preferably not more than 20,000, from the viewpoint of improving dispersion stability of the pigment, from the viewpoint of improving dispersion stability of the below-mentioned pigment-containing polymer particles in the resulting respective inks as well as from the viewpoint of improving weathering resistance of the resulting printed material.

Meanwhile, the number-average molecular weight of the polymer may be measured by the method described in Examples below.

[Production of Pigment-Containing Polymer (B) Particles]

At least one of the pigment (A1) and the pigment (A2) is preferably in the form of polymer (B) particles containing the respective pigments (hereinafter also referred to merely as "pigment-containing polymer (B) particles"), and it is more preferred that both of the pigment (A1) and the pigment (A2) are respectively contained in the form of the pigment-containing polymer (B) particles.

In the following, the method for production of the pigment-containing polymer (B) particles is explained. However, for convenience, the pigment (A1) and the pigment (A2) respectively constituting the pigment-containing polymer (B) particles are hereinafter described merely as a "pigment".

The pigment-containing polymer (B) particles may be efficiently produced in the form of a water dispersions thereof by a process including the following steps (i) and (ii).

Step (i): subjecting a mixture containing the polymer (B), the organic solvent, the pigment and water (hereinafter also referred to merely as a "pigment mixture") to dispersion treatment to obtain a dispersion liquid of the pigment-containing polymer (B) particles; and Step (ii): removing the organic solvent from the dispersion liquid obtained in the step (i) to obtain the water dispersion of the pigment-containing polymer (B) particles (hereinafter also referred to merely as a "pigment water dispersion").

(Step (i))

The step (i) is the step of subjecting a mixture containing the polymer (B), the organic solvent, the pigment and water to dispersion treatment to obtain a dispersion liquid of the pigment-containing polymer (B) particles. The step (i) is preferably conducted by the method in which the polymer (B) is first dissolved in the organic solvent to obtain an organic solvent solution of the polymer (B), and then the pigment and water, if required together with a neutralizing agent, a surfactant, etc., are added to the resulting organic solvent solution to obtain a pigment mixture, followed by subjecting the resulting pigment mixture to dispersion treatment, thereby obtaining a dispersion liquid of an oil-in-water type. The order of addition of the respective components to the organic solvent solution of the polymer (B) is not particularly limited, and it is preferred that water, the neutralizing agent and the pigment are sequentially added thereto in this order.

The organic solvent used for dissolving the polymer (B) is not particularly limited, and is preferably selected from aliphatic alcohols having not less than 1 and not more than 3 carbon atoms, ketones, ethers, esters and the like. Of these organic solvents, from the viewpoints of improving wettability to the pigment, dissolvability of the polymer (B) therein and adsorption of the polymer (B) onto the pigment, more preferred are ketones having not less than 4 and not more than 8 carbon atoms, even more preferred are methyl ethyl ketone and methyl isobutyl ketone, and further even more preferred is methyl ethyl ketone.

When the polymer (B) is synthesized by a solution polymerization method, the solvent used in the solution polymerization method may be directly used as such in the step (i).

(Neutralization)

In the case where the polymer (B) is an anionic polymer, the anionic groups contained in the polymer (B) may be neutralized using a neutralizing agent.

As the neutralizing agent, there may be mentioned hydroxides of alkali metals, ammonia, organic amines, etc. Examples of the hydroxides of alkali metals include lithium hydroxide, sodium hydroxide, potassium hydroxide and cesium hydroxide. Of these hydroxides of alkali metals, preferred is sodium hydroxide. Examples of the organic amines include trimethylamine, ethylamine, diethylamine, triethylamine, triethanolamine, etc. These neutralizing agents may be used alone or in combination of any two or more thereof.

Among the aforementioned neutralizing agents, from the viewpoint of improving weathering resistance of the resulting printed material, preferred are the hydroxides of alkali metals and ammonia, and more preferred is sodium hydroxide. Also, the polymer (B) may be previously neutralized.

The neutralizing agent is preferably used in the form of an aqueous neutralizing agent solution from the viewpoint of sufficiently and uniformly accelerating the neutralization of the anionic groups of the polymer (B). From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The neutralization degree of the anionic groups of the polymer (B) is preferably not less than 20 mol %, more preferably not less than 25 mol % and even more preferably not less than 30 mol %, and is also preferably not more than 300 mol %, more preferably not more than 200 mol %, even more preferably not more than 100 mol %, further even more preferably not more than 70 mol % and still further even more preferably not more than 50 mol %, from the viewpoint of improving dispersion stability of the pigment water dispersion as well as from the viewpoint of improving weathering resistance of the resulting printed material.

The neutralization degree as used herein means the value calculated by dividing a mole equivalent number of the neutralizing agent by a mole equivalent number of the ionic functional groups of the polymer (B), i.e., the value expressed by the formula of [(mole equivalent number of neutralizing agent)/(mole equivalent number of ionic functional groups of polymer (B))]. The neutralization degree essentially does not exceed 100 mol %. However, since the neutralization degree as defined in the present invention is calculated from the mole equivalent number of the neutralizing agent used, the neutralization degree will exceed 100 mol % if the neutralizing agent is used in an excessively large amount.

(Contents of Respective Components in Pigment Mixture)

The content of the pigment in the pigment mixture is preferably not less than 5% by mass, more preferably not less than 10% by mass and even more preferably not less than 15% by mass, and is also preferably not more than 30% by mass, more preferably not more than 25% by mass and even more preferably not more than 23% by mass, from the viewpoint of improving dispersion stability of the pigment water dispersion as well as from the viewpoint of improving weathering resistance of the resulting printed material.

The content of the polymer (B) in the pigment mixture is preferably not less than 1% by mass, more preferably not less than 3% by mass and even more preferably not less than 5% by mass, and is also preferably not more than 15% by mass, more preferably not more than 10% by mass and even more preferably not more than 8% by mass, from the viewpoint of improving dispersion stability of the pigment water dispersion as well as from the viewpoint of improving weathering resistance of the resulting printed material.

The content of the organic solvent in the pigment mixture is preferably not less than 2% by mass, more preferably not less than 4% by mass and even more preferably not less than 6% by mass, and is also preferably not more than 30% by mass, more preferably not more than 20% by mass and even more preferably not more than 10% by mass, from the viewpoints of improving wettability to the pigment and adsorption of the polymer (B) onto the pigment.

The content of water in the pigment mixture is preferably not less than 40% by mass, more preferably not less than 50% by mass and even more preferably not less than 60% by mass, and is also preferably not more than 80% by mass, more preferably not more than 75% by mass and even more preferably not more than 70% by mass, from the viewpoint of improving dispersion stability of the pigment water dispersion as well as from the viewpoint of enhancing productivity of the resulting inks.

The mass ratio of the pigment to the polymer (B) [pigment/polymer (B)] in the pigment mixture is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20, from the viewpoint of improving dispersion stability of the pigment water dispersion as well as from the viewpoint of improving weathering resistance of the resulting printed material.

(Dispersion Treatment of Pigment Mixture)

In the step (i), the aforementioned pigment mixture is subjected to dispersion treatment to obtain a dispersion liquid of the pigment-containing polymer (B) particles. The dispersing method for obtaining the dispersion liquid is not particularly limited. The pigment particles may be atomized into fine particles having a desired average particle size only by dispersion treatment using a shear stress. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the preliminary dispersion treatment in the step (i) is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be employed ordinary mixing and stirring devices such as anchor blades and disper blades; and media dispersers such as paint shakers and beads mills. Of these devices, from the viewpoint of reducing the particle size of the pigment, the media dispersers are preferably used.

When using the media dispersers, examples of a material of dispersing media particles used therein include ceramic materials such as zirconia and titania, polymer materials such as polyethylene and nylon, metals, etc. Of these materials of the dispersing media particles, from the viewpoint of attaining good abrasion resistance, preferred is zirconia. The diameter of the respective dispersing media particles is preferably not less than 0.003 mm, more preferably not less than 0.01 mm and even more preferably not less than 0.03 mm, and is also preferably not more than 0.5 mm, more preferably not more than 0.3 mm and even more preferably not more than 0.1 mm, from the viewpoint of sufficiently atomizing the pigment.

The peripheral speed of a stirring blade of the media disperser is preferably not less than 5 m/s and more preferably not less than 10 m/s, and is also preferably not more than 25 m/s and more preferably not more than 15 m/s, from the viewpoint of enhancing efficiency of production of the dispersion liquid in order to efficiently produce the pigment water dispersion.

The media disperser may be any of a circulation type and a continuous type. From the viewpoint of enhancing the production efficiency, the media disperser of a circulation type is preferably used.

The dispersing time of the media disperser is preferably not less than 0.3 hour and more preferably not less than 1 hour from the viewpoint of sufficiently atomizing the pigment, and is also preferably not more than 200 hours and more preferably not more than 50 hours from the viewpoint of enhancing efficiency of production of the dispersion liquid in order to efficiently produce the pigment water dispersion.

As a means for applying a shear stress to the pigment mixture in the substantial dispersion treatment, there may be used, for example, kneading machines such as roll mills and kneaders, high-pressure homogenizers such as "MICROFLUIDIZER" available from Microfluidics Corporation, and media dispersers such as paint shakers and beads mills. Examples of the commercially available media dispersers include "Ultra Apex Mill" available from Kotobuki Industries Co., Ltd., "Pico Mill" available from Asada Iron Works Co., Ltd., and the like. These devices may be used in combination of any two or more thereof. Among these devices, the high-pressure homogenizers are preferably used from the viewpoint of reducing the particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 1 and more preferably not less than 2, and is also preferably not more than 30, more preferably not more than 15, even more preferably not more than 10 and further even more preferably not more than 5.

(Step (ii))

The step (ii) is the step of removing the aforementioned organic solvent from the dispersion liquid obtained in the step (i) to obtain a water dispersion of the pigment-containing polymer (B) particles (pigment water dispersion). By removing the organic solvent from the dispersion liquid by any conventionally known methods, it is possible to obtain the pigment water dispersion. The organic solvent is preferably substantially completely removed from the thus obtained pigment water dispersion. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by mass and more preferably not more than 0.01% by mass.

In addition, if required, the dispersion may be subjected to heating and stirring treatments before removing the organic solvent therefrom by distillation.

In the thus-obtained pigment water dispersion, the solid polymer (B) particles containing the pigment (pigment-containing polymer (B) particles) are dispersed in a dispersing medium containing water as a main medium. The configuration of the pigment-containing polymer (B) particles that are present in the pigment water dispersion is not particularly limited, and the pigment-containing polymer (B) particles may have any configuration as long as the particles are formed of at least the pigment and the polymer (B). From the viewpoint of improving weathering resistance of the resulting printed material, examples of the preferred configuration of the pigment-containing polymer (B) particles include the particle configuration in which the pigment is enclosed (encapsulated) in the polymer (B), the particle configuration in which the pigment is uniformly dispersed in the polymer (B), the particle configuration in which the pigment is exposed onto a surface of the respective polymer (B) particles, and the configuration in which the polymer (B) is adsorbed onto the pigment. In addition to these configurations, there may also be used the configuration in which the polymer (B) is not adsorbed onto the pigment, etc., as well as a mixed configuration of these configurations. In the present invention, from the viewpoint of improving dispersion stability of the pigment water dispersion as well as from the viewpoint of improving weathering resistance of the resulting printed material, the configuration of the pigment-containing polymer (B) particles that are present in the pigment water dispersion is preferably the pigment enclosing configuration in which the pigment is incorporated into the polymer (B).

(Step (iii))

In the present invention, from the viewpoint of improving weathering resistance of the resulting printed material, the polymer (B) preferably has a crosslinked structure, and more preferably is in the form of a polymer crosslinked with a crosslinking agent.

As the method of crosslinking the polymer (B), there is preferably used such a process that further includes the following step (iii) in addition to the aforementioned steps (i) and (ii). By conducting the step (iii) in addition to the aforementioned steps (i) and (ii), it is possible to introduce a crosslinked structure into the polymer (B) constituting the pigment-containing polymer (B) particles in the water dispersion of the pigment-containing polymer (B) particles (pigment water dispersion).

Step (iii): mixing the water dispersion of the pigment-containing polymer (B) particles obtained in the strep (ii) and the crosslinking agent to obtain a water dispersion of pigment-containing polymer (B) particles after being subjected to crosslinking treatment.

From the viewpoint of efficiently conducting the crosslinking reaction in an aqueous medium as well as from the viewpoint of improving weathering resistance of the resulting printed material, the water solubility rate of the crosslinking agent is preferably not more than 50% by mass, more preferably not more than 40% by mass and even more preferably not more than 35% by mass. The term "water solubility rate as used herein means a rate (% by mass) of dissolution of the crosslinking agent in water as measured by dissolving 10 parts by mass of the crosslinking agent in 90 parts by mass of water at room temperature (25° C.).

In the case where the polymer (B) is an anionic group-containing anionic water-insoluble polymer, the crosslinking agent is preferably in the from of a compound containing a functional group that is reactive with the anionic group of the polymer, and more preferably in the from of a compound containing the two or more functional groups and preferably the not less than 2 and not more than 6 functional groups in a molecule thereof.

Suitable examples of the aforementioned crosslinking agent include a compound containing two or more epoxy groups in a molecule thereof, a compound containing two or more oxazoline groups in a molecule thereof, a compound containing two or more isocyanate groups in a molecule thereof, and the like. Of these compounds as the crosslinking agent, preferred is a compound containing two or more epoxy groups in a molecule thereof, more preferred is a compound containing a glycidyl ether group, and even more preferred is a polyglycidyl ether compound of a polyhydric alcohol containing a hydrocarbon group having not less than 3 and not more than 8 carbon atoms.

The molecular weight of the crosslinking agent is preferably not less than 120, more preferably not less than 150 and even more preferably not less than 200, and is also preferably not more than 2,000, more preferably not more than 1,500 and even more preferably not more than 1,000, from the viewpoint of facilitating the crosslinking reaction and improving weathering resistance of the resulting printed material.

The epoxy equivalent of the crosslinking agent is preferably not less than 90, more preferably not less than 100 and even more preferably not less than 110, and is also preferably not more than 300, more preferably not more than 200 and even more preferably not more than 150.

The number of epoxy groups contained in the crosslinking agent is not less than 2 per a molecule of the crosslinking agent, and is also preferably not more than 6 per a molecule of the crosslinking agent, from the viewpoint of efficiently conducting the crosslinking reaction to thereby improve weathering resistance of the resulting printed material, and further is more preferably not more than 4 per a molecule of the crosslinking agent from the viewpoint of attaining good market availability.

Specific examples of the compound containing two or more epoxy groups in a molecule thereof include polyglycidyl ethers such as polypropylene glycol diglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, 1,6-hexanediol diglycidyl ether, hydrogenated bisphenol A-type diglycidyl ethers, etc. Of these compounds, preferred is trimethylolpropane polyglycidyl ether.

The concentration of non-volatile components in the resulting pigment water dispersion (solid content of the pigment water dispersion) is preferably not less than 10% by mass and more preferably not less than 15% by mass, and is also preferably not more than 35% by mass and more preferably not more than 30% by mass, from the viewpoint of improving dispersion stability of the pigment water dispersion as well as from the viewpoint of facilitating preparation of the respective inks. The solid content of the pigment water dispersion may be measured by the method described in Examples below.

The average particle size of the pigment-containing polymer (B) particles in the pigment water dispersion is preferably not less than 40 nm, more preferably not less than 60 nm and even more preferably not less than 80 nm, and is also preferably not more than 150 nm, more preferably not more than 140 nm and even more preferably not more than 130 nm, from the viewpoint of suppressing formation of coarse particles therein and improving continuous ejection properties of the resulting water-based inks.

Meanwhile, the average particle size of the pigment-containing polymer (B) particles in the pigment water dispersion may be measured by the method described in Examples below.

<Water-Soluble Organic Solvent>

At least one of the ink (I) and the ink (II) preferably further contains a water-soluble organic solvent from the viewpoint of improving ejection stability and storage stability of the resulting respective inks and as well as from the viewpoint of improving weathering resistance to obtain a good printed material, and it is more preferred that both of the ink (I) and the ink (II) further contain the water-soluble organic solvent. The term “water-soluble” of the water-soluble organic solvent as used herein means that the organic solvent has properties capable of mixing with water at any optional ratio.

The water-soluble organic solvent preferably contains at least one water-soluble organic solvent having a boiling point of not lower than 90° C. The boiling point of the water-soluble organic solvent as a whole (in terms of a weighted mean value of boiling points of the respective water-soluble organic solvents) is preferably not lower than 150° C. and more preferably not lower than 180° C., and is also preferably not higher than 250° C., more preferably not higher than 245° C., even more preferably not higher than 220° C. and further even more preferably not higher than 200° C.

The content of the water-soluble organic solvents having a boiling point of not lower than 90° C. in the water-soluble organic solvent as a whole is preferably not less than 70% by mass, more preferably not less than 80% by mass and even more preferably not less than 90% by mass, and is also preferably not more than 100% by mass.

As the aforementioned water-soluble organic solvent, there may be mentioned a polyhydric alcohol, a polyhydric alcohol alkyl ether, a nitrogen-containing heterocyclic compound, etc.

Examples of the polyhydric alcohol include ethylene glycol, diethylene glycol, triethylene glycol, polyethylene glycol, propylene glycol, dipropylene glycol, polypropylene glycol, glycerin, etc.

Examples of the polyhydric alcohol alkyl ether include diethylene glycol monoalkyl ethers, triethylene glycol monoalkyl ethers, dipropylene glycol monoalkyl ethers, etc.

Examples of the nitrogen-containing heterocyclic compound include N-methyl-2-pyrrolidone, 2-pyrrolidone, 1,3-dimethyl imidazolidinone, etc.

Of these water-soluble organic solvents, preferred is the polyhydric alcohol, more preferred is at least one water-soluble organic solvent selected from the group consisting of diethylene glycol, propylene glycol and glycerin, even more preferred is at least one water-soluble organic solvent selected from the group consisting of propylene glycol and glycerin, and further even more preferred is propylene glycol. These water-soluble organic solvents may be used alone or in combination of any two or more thereof.

The aforementioned water-soluble organic solvent may also contain an organic solvent(s) having a boiling point higher than 250° C. However, the content of the organic solvent(s) having a boiling point higher than 250° C. in the water-soluble organic solvent is preferably less than 10% by mass, more preferably not more than 5% by mass, even more preferably not more than 3% by mass and further even more preferably not more than 1% by mass.

(Surfactant)

At least one of the ink (I) and the ink (II) preferably further contains a surfactant, and it is more preferred that both of the ink (I) and the ink (II) further contain the surfactant. Examples of the surfactant include a nonionic surfactant, an anionic surfactant, an ampholytic surfactant, a silicone-based surfactant, a fluorine-based surfactant, etc. Among these surfactants, preferred is a silicone-based surfactant.

[Contents of Respective Components in Water-Based Inks and Properties of Inks]

The content of the respective components in each of the ink (I) and the ink (II) according to the present invention as well as properties of the respective inks are as follows.

(Content of Pigment)

The content of the pigment (A1) in the ink (I) or the content of the pigment (A2) in the ink (II) is preferably not less than 1% by mass, more preferably not less than 2% by mass and even more preferably not less than 3% by mass from the viewpoint of enhancing image density of the respective inks. Also, the content of the pigment (A1) in the ink (I) or the content of the pigment (A2) in the ink (II) is preferably not more than 15% by mass, more preferably not more than 10% by mass and even more preferably not more than 5% by mass from the viewpoint of suppressing increase in viscosity of the respective inks upon volatilization of the solvent therefrom and improving storage stability and ejection stability of the respective inks as well as from the viewpoint of improving weathering resistance to obtain a good printed material.

(Content of Polymer (B))

The content of the polymer (B) in the ink (I) or the ink (II) is preferably not less than 0.3% by mass, more preferably not less than 0.5% by mass and even more preferably not less than 1% by mass, and is also preferably not more than 7% by mass, more preferably not more than 5% by mass and even more preferably not more than 3% by mass, from the viewpoint of improving storage stability and ejection stability of the respective inks as well as from the viewpoint of improving weathering resistance to obtain a good printed material.

The mass ratio of the pigment to the polymer (B) [pigment/polymer (B)] in the ink (I) or the ink (II), preferably the mass ratio of the pigment to the polymer (B) [pigment/polymer (B)] in both of the ink (I) and the ink (II), is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20, from the viewpoint of improving dispersion stability of the pigment as well as from the viewpoint of improving weathering resistance of the resulting printed material.

The expression "mass ratio of the pigment to the polymer (B) [pigment/polymer (B)] in both of the ink (I) and the ink (II)" as used herein means both of the mass ratio of the pigment (A1) to the polymer (B) [pigment (A1)/polymer (B)] in the ink (I) and the mass ratio of the pigment (A2) to the polymer (B) [pigment (A2)/polymer (B)] in the ink (II).

In the case where the pigment in the ink (I) or the ink (II) is in the form of the pigment-containing polymer (B) particles, the average particle size of the pigment-containing polymer (B) particles in the ink is preferably not less than 40 nm, more preferably not less than 60 nm and even more preferably not less than 80 nm, and is also preferably not more than 150 nm, more preferably not more than 140 nm and even more preferably not more than 130 nm, from the viewpoint of suppressing formation of coarse particles therein and improving continuous ejection properties of the resulting water-based inks.

The pigment-containing polymer (B) particles in the ink (I) or the ink (II) are preferably free of swelling or contraction of the particles and flocculation between the particles. In addition, it is also preferred that the average particle size of the pigment-containing polymer (B) particles in the ink (I) or the ink (II) is identical to the average particle size of the pigment-containing polymer (B) particles in the aforementioned pigment water dispersion.

The average particle size of the pigment-containing polymer (B) particles in the ink (I) or the ink (II) may be measured by the method described in Examples below.

(Content of Water-Soluble Organic Solvent)

The content of the water-soluble organic solvent in the ink (I) or the ink (II) is preferably not less than 25% by mass, more preferably not less than 30% by mass, even more preferably not less than 35% by mass and further even more preferably not less than 40% by mass, and is also less than 50% by mass and preferably not more than 48% by mass, from the viewpoint of improving ejection stability and storage stability of the respective inks as well as from the viewpoint of improving weathering resistance to obtain a good printed material.

(Content of Surfactant)

The content of the surfactant in the ink (I) or the ink (II) is preferably not less than 0.01% by mass, more preferably not less than 0.02% by mass and even more preferably not less than 0.05% by mass, and is also preferably not more than 3% by mass, more preferably not more than 2% by mass and even more preferably not more than 1% by mass, from the viewpoint of improving weathering resistance to obtain a good printed material.

(Content of Water)

The content of water in the ink (I) or the ink (II) is preferably not less than 20% by mass, more preferably not less than 30% by mass and even more preferably not less than 40% by mass, and is also preferably not more than 70% by mass, more preferably not more than 60% by mass and even more preferably not more than 55% by mass.

In the ink set of the present invention, the mass ratio of the pigment (A1) to the pigment (A2) [(A1)/(A2)] which are contained in the ink (I) and the ink (II), respectively, is preferably not less than 10/90, more preferably not less than 25/75 and even more preferably not less than 40/60, and is also preferably not more than 90/10, more preferably not more than 75/25 and even more preferably not more than 60/40, from the viewpoint of improving weathering resistance of the resulting printed material.

(Other Components)

The ink (I) or the ink (II) of the present invention may further contain, in addition to the aforementioned components, various additives that may be usually used in inks, such as a viscosity controller, a defoaming agent, an antiseptic agent, a mildew-proof agent, a rust preventive, etc.

(Properties of Inks)

The static surface tension of each of the ink (I) and the ink (II) as measured at 20° C. is, respectively, preferably not less than 22 mN/m, more preferably not less than 24 mN/m and even more preferably not less than 25 mN/m, and is also preferably not more than 50 mN/m, more preferably not more than 45 mN/m and even more preferably not more than 40 mN/m, from the viewpoint of improving weathering resistance of the resulting printed material. The static surface tension of the respective inks may be measured by the method described in Examples below.

The viscosity of each of the ink (I) and the ink (II) as measured at 32° C. is, respectively, preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving weathering resistance of the resulting printed material. The viscosity of the respective inks may be measured by the method described in Examples below.

The ink set of the present invention is not particularly limited as long as it contains at least the ink (I) and the ink (II), and may also contain the other ink(s) in addition to the ink (I) and the ink (II). As the ink set containing the other ink(s) in addition to the ink (I) and the ink (II), there may be used any of a 3-color ink set, a 4-color ink set, a 5-color ink set, a 6-color ink set and a 7 or more-color ink set.

[Ink-Jet Printing Method]

In the ink-jet printing method of the present invention, the aforementioned ink set is loaded to an ink-jet printing apparatus to form characters or images on a printing medium by a process including the following steps 1 and 2:

Step 1: ejecting at least one of the ink (I) and the ink (II) onto the printing medium; and Step 2: further ejecting the other of the ink (I) and the ink (II) onto the one of the ink (I) and the ink (II) previously ejected onto the printing medium in the step 1 in an overlapped manner.

As the method of ejecting droplets of the respective inks, there may be used either a piezoelectric method or a thermal method. Among these methods, from the viewpoint of improving weathering resistance of the resulting printed material, the piezoelectric method is preferably used. In the piezoelectric method, the ink droplets are ejected from a number of nozzles communicated with respective pressure chambers by vibrating a wall surface of the respective pressure chambers by means of a piezoelectric element.

In the present invention, the ink set containing at least the ink (I) and the ink (II) according to the present invention is loaded to ink cartridges for respective colors in the ink-jet printing apparatus, and droplets of the inks are ejected from respective ejection nozzles corresponding to the respective ink cartridges, so that it is possible to form characters or images on the printing medium. The ink (I) and the ink (II) may be ejected onto the printing medium so as to overlap on each other on the printing medium. The order of ejection of the ink (I) and the ink (II) is optional and any of the ink (I) and the ink (II) may be ejected earlier, but it is preferred that the ink (II) is ejected onto the printing medium prior to ejecting the ink (I) thereonto. The ejection time interval between the ink (I) and the ink (II) is preferably not less than 0.1 second and more preferably not less than 1 second, and the ejection time interval between the ink (I) and the ink (II) is also not more than 30 seconds from the viewpoint of improving weathering resistance of the resulting printed material.

The voltage applied to the print head is preferably not less than 5 V, more preferably not less than 10 V and even more preferably not less than 15 V, and is also preferably not more than 40 V, more preferably not more than 35 V and even more preferably not more than 30 V, from the viewpoint of conducting high-speed printing with a high efficiency, etc.

The drive frequency of the print head is preferably not less than 10 kHz and more preferably not less than 20 kHz from the viewpoint of conducting high-speed printing with a high efficiency, etc., and is also preferably not more than 300 kHz, more preferably not more than 150 kHz, even more preferably not more than 90 kHz and further even more preferably not more than 50 kHz, from the viewpoint of improving drying properties of the respective inks.

The amount of droplets of the respective inks ejected is preferably not less than 1 pL, more preferably not less than 2 pL, even more preferably not less than 3 pL and further even more preferably not less than 4 pL, and is also preferably not more than 30 pL, more preferably not more than 25 pL and even more preferably not more than 20 pL, as calculated per one ink droplet ejected, from the viewpoint of maintaining good accuracy of impact positions of the ink droplets and improving quality of printed characters or images.

The printing resolution is preferably not less than 300 dpi and more preferably not less than 500 dpi. Meanwhile, the term "printing resolution" as used in the present invention means the number of dots per inch (2.54 cm) which are formed on the printing medium. For example, the "printing resolution of 600 dpi" means that when ejecting ink droplets onto a printing medium using a line head on which the number of nozzle ports arranged per a length of a nozzle row is 600 dpi (dots/inch), a corresponding dot row of 600 dpi per inch is formed in the direction perpendicular to a transporting direction of the printing medium, and further when ejecting the ink droplets while moving the printing medium in the transporting direction thereof, a dot row of 600 dpi per inch is also formed along the transporting direction on the printing medium. In the present invention, the printing resolution in the direction perpendicular to the transporting direction of the printing medium is expressed as being the same as the value of the printing resolution in the transporting direction of the printing medium.

The transportation speed of the printing medium is preferably not less than 20 m/min, more preferably not less than 70 m/min and even more preferably not less than 100 m/min from the viewpoint of improving weathering resistance of the resulting printed material. The transportation speed of the printing medium is also preferably not more than 200 m/min, more preferably not more than 150 m/min and even more preferably not more than 120 m/min from the viewpoint of reducing drying load of the printed material obtained after ejecting the respective inks. Meanwhile, the transportation speed of the printing medium as used herein means the speed of the printing medium moved relative to the moving direction thereof upon forming characters or images on the printing medium.

The inside temperature of the print head upon printing is preferably controlled to not lower than 20° C., more preferably not lower than 25° C. and even more preferably not lower than 30° C., and is also preferably controlled to not higher than 45° C., more preferably not higher than 40° C. and even more preferably not higher than 35° C., from the viewpoint of reducing viscosity of the respective inks and improving continuous ejection properties of the inks.

The temperature of the surface of the printing medium opposed to the ejection region of the print head for ejecting the respective inks is preferably not lower than 28° C., more preferably not lower than 30° C. and even more preferably not lower than 31° C., and is also preferably not higher than 45° C., more preferably not higher than 40° C. and even more preferably not higher than 38° C.

As the printing medium, there may be mentioned a water-absorbing printing medium such as a plain paper, a wood-free paper, etc., a low-water absorbing printing medium such as an art paper, a coated paper, etc., a non-water absorbing printing medium such as a synthetic resin film, etc. Among these printing media, from the viewpoint of improving suitability thereof when used in the outdoor applications, preferred is the low-water absorbing printing medium.

Examples of the art paper include "OK Ultra-Aqua-Satin", "OK Kinfuji", "SA Kinfuji" and "Satin Kinfuji" all available from Oji Paper Co., Ltd.; "Hyper Pyrenees" and "Silver Dia" both available from Nippon Paper Industries, Co., Ltd.; "Green Utrillo" available from DAIO Paper Co., Ltd.; "Pearl Coat" and "New V Mat" both available from Mitsubishi Paper Mills Ltd., etc.

Examples of the coated paper include "OK Topcoat +" (basis weight: 104.7 $g/m^2$; 60° gloss: 49.0; water absorption as measured by contacting with water for 100 milliseconds (hereinafter also defined in the same way): 4.9 $g/m^2$) available from Oji Paper Co., Ltd., a multi-color foam glossy coated paper (104.7 $g/m^2$; 60° gloss: 36.8; water absorption: 5.2 $g/m^2$) available from Oji Paper Co., Ltd., "UPM Finesse Gloss" (115 $g/m^2$; 60° gloss: 27.0; water absorption: 3.1 $g/m^2$) available from UPM, "UPM Finesse Matt" (115 $g/m^2$; 60° gloss: 5.6; water absorption: 4.4 $g/m^2$) available from UPM, "TerraPress Silk" (80 $g/m^2$; 60° gloss: 6.0; water absorption: 4.1 $g/m^2$) available from Stora Enso, "LumiArt" (90 $g/m^2$; 60° gloss: 26.3) available from Stora Enso, etc.

Examples of the synthetic resin film include a polyester film, a polyvinyl chloride film, a polypropylene film, a polyethylene film, a nylon film, etc. These films may be subjected to surface treatments such as corona treatment, etc., if required.

Examples of the generally available synthetic resin films include "LUMIRROR T60" (polyethylene terephthalate; thickness: 125 μm; 60° gloss: 189.1; water absorption: 2.3 $g/m^2$) available from Toray Industries Inc., "PVC80B P" (polyvinyl chloride; 60° gloss: 58.8; water absorption: 1.4 $g/m^2$) available from Lintec Corporation, "KINATH KEE 70CA" (polyethylene) available from Lintec Corporation, "YUPO SG90 PAT1" (polypropylene) available from Lintec Corporation, "BONYL RX" (nylon) available from Kohjin Film & Chemicals Co., Ltd., etc.

The water absorption of the low-water absorbing printing medium as measured by contacting the printing medium with pure water for 100 milliseconds is preferably not less than 0 $g/m^2$, more preferably not less than 1 $g/m^2$ and even more preferably not less than 2 $g/m^2$ from the viewpoint of improving weathering resistance of the resulting printed material, and is also preferably not more than 10 $g/m^2$, more preferably not more than 8 $g/m^2$ and even more preferably not more than 6 $g/m^2$ from the viewpoint of improving adaptability of the resulting printed material when used in the outdoor applications. The aforementioned water absorption may be measured using an automatic scanning absorptometer by the method described in Examples below.

[Ink-Jet Printed Material]

The ink-jet printed material obtained by the ink-jet printing method of the present invention includes characters or images formed on a printing medium, in which an image region exhibiting a single hue in the characters or images contains a pigment (A1) having a barbituric acid-derived structure and a diketopyrrolopyrrole pigment (A2). Thus, since the pigment (A1) having a barbituric acid-derived structure and the diketopyrrolopyrrole pigment (A2) are present in the image region exhibiting a single hue in which the barbituric acid-derived structure contains an amide bond in a part of a six-membered ring thereof and the diketopyrrolopyrrole pigment also contains an amide bond in a part of a five-membered ring thereof, the state of electrons in the image region can be stabilized by similarity of both the structures of the pigments as well as electrostatic interaction between the pigments such as a hydrogen bond between molecules thereof owing to the molecular structures of the pigments. As a result, it is possible to obtain a printed material that has a less change in hue of the image region containing the red-based pigment and the yellow pigment and is excellent in weathering resistance even when used in the outdoor applications.

EXAMPLES

In the following Synthesis Examples, Production Examples, Examples and Comparative Examples, the "part(s)" and "%" indicate "part(s) by mass" and "% by mass", respectively, unless otherwise specified.

(1) Measurement of Number-Average Molecular Weight of Polymer (B)

The number-average molecular weight of the polymer (B) was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using monodisperse polystyrenes having known molecular weights as a reference standard substance.

(2) Measurement of Solid Content of Water Dispersion of Pigment-Containing Polymer (B) Particles Sodium sulfate dried to constant weight in a desiccator was weighed and charged in an amount of 10.0 g into a 30 mL ointment container, and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(3) Measurement of Average Particle Size of Pigment-Containing Polymer (B) Particles The water dispersion or the water-based ink was subjected to cumulant analysis using a laser particle analyzing system "Model No.: ELS-8000" available from Otsuka Electronics Co., Ltd., to measure a cumulant average particle size of the particles contained therein. The thus obtained cumulant average particle size was regarded as an average particle size of the pigment-containing polymer (B) particles contained in the water dispersion or the water-based ink. The measurement was conducted using a dispersion prepared by diluting the water dispersion or the water-based ink to be measured with water so as to adjust a concentration of the particles therein to about $5\times10^{-3}$%. The measurement was also conducted under the conditions including a temperature of 25° C., an angle between incident light and detector of 90° and a cumulative number of 100 times, and a refractive index of water (1.333) was input to the analyzing system as a refractive index of the dispersing medium.

(4) Measurement of Static Surface Tension of Water-Based Ink

A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.

(5) Measurement of Viscosity of Water-Based Ink

The viscosity of the water-based ink was measured at 32° C. for 1 minute using an E-type viscometer "RE80L" available from Toki Sangyo Co., Ltd., equipped with a standard rotor (1°34'×R24). The rotating speed of the viscometer was adjusted to a highest measurable speed, but controlled to 100 rpm at the maximum.

(6) Evaluation of Storage Stability of Water Based Ink

The water-based ink was filled in a hermetically sealed glass container, and stored therein by allowing the ink to stand at 70° C. for 28 days. The water-based ink after being thus stored was used as a test sample. The viscosity of the test sample was measured by the same method as described in the above "(5) Measurement of Viscosity of Water-Based Ink", and defined as "viscosity after storage". The rate of change in viscosity of the water-based ink between before and after the storage test was calculated according to the following formula. As the rate of change in viscosity of the water-based ink is closer to 100%, the storage stability of the water-based ink becomes higher.

Rate of Change in Viscosity (%)=(Viscosity of Water-Based Ink after Storage/Viscosity of Water-Based Ink before Storage)×100

(7) Water Absorption of Printing Medium

The water absorption of a printing medium as measured by contacting the printing medium with pure water for 100 milliseconds was determined as follows. That is, using an automatic scanning absorptometer "KM500win" available from Kumagai Riki Kogyo Co., Ltd., an amount of pure water transferred to the printing medium when allowing the printing medium to contact with pure water at 23° C. under a relative humidity of 50% for 100 milliseconds was measured as a water absorption thereof. The measuring conditions are as follows.

"Spiral Method"

Contact time: 0.010 to 1.0 (sec)
Pitch (mm): 7
Length Per Sampling (degree): 86.29
Start Radius (mm): 20
End Radius (mm): 60
Min Contact Time (ms): 10
Max Contact Time (ms): 1000
Sampling Pattern (1-50): 50
Number of Sampling Points (>0): 19

"Square Head"

Slit Span (mm): 1
Slit Width (mm): 5

(Synthesis of Polymer (B))

Synthesis Example 1

One hundred eight parts of styrene available from Wako Pure Chemical Industries, Ltd., 8 parts of a-methyl styrene available from Wako Pure Chemical Industries, Ltd., and 84 parts of acrylic acid available from Wako Pure Chemical Industries, Ltd., were mixed with each other to prepare a monomer mixture solution as a mixture of these monomers. Twenty parts of methyl ethyl ketone (MEK) and 0.3 part of 2-mercaptoethanol as a polymerization chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing the remainder of the monomer mixture solution, i.e., 90% of the aforementioned monomer mixture solution, 0.27 part of the aforementioned polymerization chain transfer agent, 60 parts of MEK and 2.2 parts of an azo-based radical polymerization initiator "V-65" (tradename; 2,2'-azobis(2,4-dimethylvaleronitrile)) available from Wako Pure Chemical Industries, Ltd., was charged into a dropping funnel. In a nitrogen atmosphere, the monomer mixture solution in the reaction vessel was heated to 65° C. while stirring, and then the mixed solution in the dropping funnel was added dropwise thereinto over 3 hours. After the elapse of 2 hours from completion of the dropwise addition while maintaining the resulting mixed solution at 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a polymer (B1) solution [number-average molecular weight of polymer (B1): 10,500; mass ratio between constitutional units derived from respective monomers (styrene/α-methyl styrene/acrylic acid)=54/4/42].

(Production of Water Dispersion of Pigment-Containing Polymer (B) Particles)

Production Example 1-1

(Step (i))

The polymer (B1) produced by drying the polymer (B1) solution obtained in Synthesis Example 1 under reduced pressure was weighed in an amount of 58.1 parts, and mixed with 71.5 parts of MEK, and then 23.6 parts of a 5N sodium hydroxide aqueous solution (content of sodium hydroxide as solid components: 16.9%; for volumetric titration) available from Wako Pure Chemical Industries, Ltd., were further added to the resulting mixed solution to thereby neutralize the polymer (B1) such that the ratio of the number of moles of sodium hydroxide to the number of moles of carboxy groups of the polymer (B1) was 40 mol % (neutralization degree: 40 mol %).

Furthermore, 695.1 parts of ion-exchanged water were added to the mixed solution, and 200 g of a pigment "IRGAZIN RED L 3630" (PR254) as a pigment (A2) available from BASF AG was added to the solution. The thus obtained mixture was stirred at 20° C. for 60 minutes using a disper "ULTRA DISPER" (tradename) available from Asada Iron Works Co., Ltd., while operating a disper blade thereof at a rotating speed of 7,000 rpm, thereby obtaining a pigment mixture.

The resulting pigment mixture was subjected to dispersion treatment by a circulation method using a media disperser "Ultra Apex Mill; Model No.: UAM-1" available from Kotobuki Industries Co., Ltd., packed with 0.05 mmϕ zirconia beads "YTZ Ball" (as dispersing media particles produced by granulation method; beads packing rate: 80%) available from Nikkato Corporation under the conditions including an stirring blade peripheral speed of 12 m/s and a circulation flow rate of 500 mL/min for 2 hours.

Next, the thus obtained dispersion was further subjected to dispersion treatment by a high-pressure dispersing method under a pressure of 150 MPa using a high-pressure homogenizer "Microfluidizer" available from Microfluidics Corporation by passing the dispersion through the device 3 times, thereby obtaining a dispersion liquid of pigment (PR254)-containing polymer (B1) particles.

(Step (ii))

A 2 L eggplant-shaped flask was charged with 1,000 g of the dispersion liquid obtained in the step (i), and then 666.7 g of ion-exchanged water was added thereto (solid content: 15.0% by mass). The resulting mixture was maintained under a pressure of 0.09 MPa in a warm water bath adjusted to 32° C. for 3 hours using a rotary distillation apparatus "Rotary Evaporator N-1000S" available from Tokyo Rikakikai Co., Ltd., operated at a rotating speed of 50 rpm to remove the organic solvent therefrom. Moreover, the temperature of the warm water bath was adjusted to 62° C., and the pressure in the apparatus was reduced to 0.07 MPa, and the contents of the flask was concentrated under this condition until a solid content of the obtained dispersion reached 25.0% by mass, thereby obtaining a water dispersion D'1 of the pigment (PR254)-containing polymer (B1) particles.

(Step (iii))

The water dispersion D'1 thus obtained in the step (ii) was charged into a 500 mL-capacity angle rotor, and subjected to centrifugal separation using a high-speed cooling centrifuge "himac CR22G" (temperature set: 20° C.) available from Hitachi Koki Co., Ltd., at 7,000 rpm for 20 minutes. Thereafter, the liquid layer portion thus separated from the water dispersion was subjected to filtration treatment through a 5 μm-mesh membrane filter "Minisart" available from Sartorius Inc.

Four hundred grams of the resulting filtrate (PR254: 76.0 g; polymer (B1): 22.1 g) were mixed with 61.61 g of ion-exchanged water and 1.08 g of "Ploxel LVS" (mildew-proof agent; active ingredient content: 20%) available from Arch Chemicals Japan, Inc., and further mixed with 4.86 g of trimethylolpropane polyglycidyl ether "DENACOL EX-321L" (tradename; epoxy equivalent: 130) as a crosslinking agent available from Nagase ChemteX Corporation, followed by stirring the resulting mixture at 70° C. for 3 hours to subject the mixture to crosslinking treatment, thereby obtaining the polymer (B1) having a crosslinked structure. The obtained reaction solution was cooled to 25° C., and then subjected to filtration treatment through the aforementioned 5 μm-mesh filter. Furthermore, the obtained filtered material was mixed with ion-exchanged water so as to adjust a solid content of the resulting mixture to 22.0%, thereby obtaining a water dispersion D1 of pigment (PR254)-containing polymer (B1) particles after being subjected to crosslinking treatment. The average particle size of the pigment (PR254)-containing polymer (B1) particles in the thus obtained water dispersion D1 was 126 nm.

Production Examples 1-2 to 1-4

The same procedure as in Production Example 1-1 was repeated except that the pigment "IRGAZIN RED L 3630" (PR254) available from BASF AG used in Production Example 1-1 was replaced with the respective pigments shown in Table 1, thereby obtaining water dispersions D2 to D4 of pigment-containing polymer (B) particles after being subjected to crosslinking treatment. The average particle sizes of the pigment-containing polymer (B) particles after being subjected to crosslinking treatment in the thus obtained respective water dispersions are shown in Table 1.

Meanwhile, the respective notations shown in Table 1 are as follows. PR122: C.I. Pigment Red 122; quinacridone pigment "Chromofine Red 6111T" (tradename) available from Dainichiseika Color & Chemicals Mfg. Co., Ltd.

PY150: C.I. Pigment Yellow 150; "BAYSCRIPT Yellow 4GF" (tradename) available from LANXESS K.K.

PY74: C.I. Pigment Yellow 74; monoazo pigment "Fast Yellow 011" (tradename) available from Dainichiseika Color & Chemicals Mfg. Co., Ltd.

B1: Polymer (B1); mass ratio between constitutional units derived from respective monomers (styrene/α-methyl styrene/acrylic acid)=54/4/42 EX-321L: "DENACOL EX-321L" (trimethylolpropane polyglycidyl ether)

TABLE 1

| Production Examples | Water dispersion of pigment-containing polymer (B) particles No. | Pigment Kind | Polymer (B) Kind | Neutralizing agent Kind | Neutralization degree (mol %) | Crosslinking agent Kind | Water dispersion of pigment-containing polymer (B) particles Average particle size (nm) |
|---|---|---|---|---|---|---|---|
| 1-1 | D1 | PR254 | B1 | NaOH | 40 | EX-321L | 126 |
| 1-2 | D2 | PR122 | B1 | NaOH | 40 | EX-321L | 90 |
| 1-3 | D3 | PY150 | B1 | NaOH | 40 | EX-321L | 95 |
| 1-4 | D4 | PY74 | B1 | NaOH | 40 | EX-321L | 94 |

(Production of Water-Based Inks)

Production Example 2-1

The water dispersion D1 of the pigment (PR254)-containing polymer (B1) particles after being subjected to crosslinking treatment (solid content: 22.0%) obtained in Production Example 1-1 in an amount of 24.62 g was mixed with 46.0 g of propylene glycol available from Wako Pure Chemical Industries, Ltd., and 0.05 g of a silicone-based surfactant “SILFACE SAG005” (tradename; main component: polyether-modified silicone; kinematic viscosity: 170 $mm^2/s$; HLB: 7) available from Nissin Chemical Industry Co., Ltd., and the resulting mixture was mixed with 29.33 parts of ion-exchanged water so as to adjust a total amount of the mixture to 100 g, thereby obtaining an ink 1. The average particle size of the pigment-containing polymer (B) particles in the resulting ink 1 is shown in Table 2.

Incidentally, the static surface tension of the ink as measured at 20° C. was 37 mN/m, and the viscosity of the ink as measured at 32° C. was 5.75 mPa·s.

Production Examples 2-2 to 2-4

The same procedure as in Production 2-1 was repeated except that the water dispersion D1 (solid content: 22.0%) obtained in Production Example 1-1 was replaced with the respective water dispersions (solid content: 22.0%) as shown in Table 2, thereby obtaining inks 2 to 4. The average particle sizes of the pigment-containing polymer (B) particles in the thus obtained respective inks are shown in Table 2.

TABLE 2

| | | | Ink Composition | | | | | | | | |
|---|---|---|---|---|---|---|---|---|---|---|---|
| | | No. of | Pigment | | Polymer (B) | | | Surfactant | Water-soluble organic solvent | | Water |
| Production Examples | Ink No. | water dispersion of pigment-containing polymer (B) particles | Kind | Content (% by mass) | Kind | Crosslinking agent | Content (% by mass) | Content (% by mass) | Kind | Content (% by mass) | Content (% by mass) |
| 2-1 | 1 | D1 | PR254 | 4.0 | B1 | EX-321L | 1.4 | 0.05 | PG | 46.0 | 48.6 |
| 2-2 | 2 | D2 | PR122 | 4.0 | B1 | EX-321L | 1.4 | 0.05 | PG | 46.0 | 48.6 |
| 2-3 | 3 | D3 | PY150 | 4.0 | B1 | EX-321L | 1.4 | 0.05 | PG | 46.0 | 48.6 |
| 2-4 | 4 | D4 | PY74 | 4.0 | B1 | EX-321L | 1.4 | 0.05 | PG | 46.0 | 48.6 |

| | Ink properties | |
|---|---|---|
| Production Examples | Average particle size of pigment-containing polymer (B) particles nm | Storage stability % |
| 2-1 | 125 | 100 |
| 2-2 | 92 | 98 |
| 2-3 | 92 | 102 |
| 2-4 | 93 | 103 |

Meanwhile, "PG" in Table 2 represents propylene glycol. In addition, the respective notations concerning the pigment, polymer (B) and crosslinking agent as shown in Table 2 are the same as those described in Table 1.

(Production of Ink-Jet Printed Materials)

Example 1

(Step 1)

Image printing was conducted on a coated paper "OK Topcoat +" as a printing medium available from Oji Paper Co., Ltd., under the following ink-jet printing conditions using the water-based inks obtained above.

Under the environmental conditions of a temperature of 25±1° C. and a relative humidity of 30±5%, the ink 3 as the ink (I) and the ink 1 as the ink (II) were loaded into a print evaluation apparatus available from Trytech Co., Ltd., equipped with an ink-jet print head "KJ4B-HD06MHG-STDV" (piezoelectric type) available from Kyocera Corporation. The following ink-jet printing conditions were set, and the printing medium was fixed on a transportation table by vacuum such that the longitudinal direction of the printing medium was aligned with a transportation direction thereof.

A printing command was transmitted to the aforementioned print evaluation apparatus to eject the ink (II) onto the printing medium and thereby print a Duty 100% solid image having a size of 10 cm×10 cm on the printing medium.

(Ink-Jet Printing Conditions)

Voltage applied to print head: 26 V;

Drive frequency of print head: 20 kHz;

Amount of ink droplets ejected: 12 pL;

Inside temperature of print head: 32° C.;

Resolution: 600 dpi;

Number of ink shots for flushing before ejection: 200 shots; and

Negative pressure: −4.0 kPa.

(Step 2)

A further printing command was transmitted to the aforementioned print evaluation apparatus to eject the ink (I) onto the ink (II) previously ejected onto the printing medium as obtained in the step 1 in an overlapped manner such that the ejection time interval between the ink (I) and the ink (II) was about 5 seconds, thereby printing the Duty 100% solid image having a size of 10 cm×10 cm on the printing medium. The thus obtained printed image was allowed to stand at room temperature (25° C.) for one day, thereby obtaining an ink-jet printed material.

Comparative Examples 1 to 3

The same procedure as in Example 1 was repeated except that the ink set was replaced with those ink sets shown in Table 3, thereby obtaining ink-jet printed materials.

Reference Examples 1 and 2

The same procedure as in Example 1 was repeated except that the ink (II) used in the step 1 was replaced with those inks shown in Table 3, and no step 2 in Example 1 was conducted and only the step 1 was conducted in the same manner as in Example 1, followed by allowing the resulting printed image to stand at room temperature (25° C.) for one day, thereby obtaining ink-jet printed materials.

Reference Examples 3 and 4

The same procedure as in Example 1 was repeated except that the ink (I) used in the step 2 was replaced with those inks shown in Table 3, and no step 1 in Example 1 was conducted and only the step 2 was conducted in the same manner as in Example 1, i.e., the ink (I) was ejected onto the printing medium to print a Duty 100% solid image having a size of 10 cm×10 cm on the printing medium, followed by allowing the resulting printed image to stand at room temperature (25° C.) for one day, thereby obtaining ink-jet printed materials.

<Evaluation of Weathering Resistance of Ink-Jet Printed Materials>

The respective ink-jet printed materials obtained above were subjected to accelerated weathering test using a weatherometer "specification: Ci3000+F" available from ATLAS equipped with an inner filter and an outer filter both made of soda lime under the conditions including an illuminance of 60 W, a temperature of 40° C., a humidity of 75% and a black panel temperature of 65° C. for 24 hours. Thereafter, L*, a* and b* values of the image on the ink-jet printed material were measured at optional 10 positions thereof using an optical densitometer "SpectroEye" available from GretagMacbeth AG to calculate an amount of change in hue of the image ΔE from the L*, a* and b* values before and after the accelerated weathering test. The smaller the ΔE value is, the more excellent the weathering resistance of the ink-jet printed material becomes. The results are shown in Table 3.

Amount of change in hue $\Delta E=[(L^*_1-L^*_2)^2+(a^*_1-a^*_2)^2+(b^*_1-b^*_2)^2]^{1/2}$ wherein $L^*_1$, $a^*_1$ and $b^*_1$ represent L*, a* and b* values before the accelerated weathering test, respectively; and $L^*_2$, $a^*_2$ and $b^*_2$ represent L*, a* and b* values after the accelerated weathering test, respectively.

TABLE 3

| | Composition of ink set | | | | Evaluation results |
|---|---|---|---|---|---|
| | Ink (I) | | Ink (II) | | Amount of |
| | Ink No. | Kind of pigment | Ink No. | Kind of pigment | change in hue ΔE |
| Example 1 | 3 | PY150 | 1 | PR254 | 1.2 |
| Comparative Example 1 | 4 | PY74 | 2 | PR122 | 4.0 |
| Comparative Example 2 | 3 | PY150 | 2 | PR122 | 2.3 |
| Comparative Example 3 | 4 | PY74 | 1 | PR254 | 4.5 |
| Reference Example 1 | — | — | 1 | PR254 | 2.5 |
| Reference Example 2 | — | — | 2 | PR122 | 1.8 |
| Reference Example 3 | 3 | PY150 | — | — | 2.8 |
| Reference Example 4 | 4 | PY74 | — | — | 7.3 |

From Table 3, it was confirmed that the ink set used in Example 1 was capable of providing the printed material having a small amount of change in hue ΔE and exhibiting excellent weathering resistance as compared to the ink sets used in Comparative Examples 1 to 3.

The ink-jet printed material obtained in Example 1 exhibited a smaller amount of change in hue ΔE than the arithmetical mean value calculated from the amounts of change in hue ΔE of the ink-jet printed materials obtained in Reference Example 1 using the ink 1 containing PR254 solely and Reference Example 3 using the ink 3 containing PY150 solely, and therefore was synergistically improved in weathering resistance. For this reason, it was considered that the state of electrons in the image region of the ink-jet printed material obtained in Example 1 was stabilized by similarity of the structures of the pigment (A1) and the pigment (A2) contained in the ink (I) and the ink (II), respectively, as well as an electrostatic interaction therebetween owing to a hydrogen bond between molecules thereof due to the molecular structures of the pigments, etc.

On the other hand, it was confirmed that in Comparative Examples 1 to 3, the ink (I) containing the pigment (A1) and the ink (II) containing the pigment (A2) were not used in combination with each other, and therefore the ink-jet printed materials obtained using the ink sets of Comparative Examples 1 to 3 exhibited a large amounts of change in hue ΔE and were deteriorated in weathering resistance as compared to the ink-jet printed material obtained using the ink set of Example 1.

In Reference Example 2, the ink 2 containing PR122 was used solely, and the resulting ink-jet printed material exhibited good weathering resistance. However, it was confirmed that in Comparative Examples 1 and 2 in which the ink 4 containing PY74 or the ink 3 containing PY150 was used in combination with the ink 2 containing PR122, the resulting ink-jet printed materials merely exhibited such an amount of change in hue ΔE as being similar to an arithmetical mean value of the amounts of change in hue ΔE of the respective inks as compared to Reference Examples 2 to 4 in which these inks were respectively used solely.

In addition, it was confirmed that even in Comparative Example 3 in which the ink 4 containing PY74 and the ink 1 containing PR254 were used in combination with each other, the resulting ink-jet printed material also merely exhibited such an amount of change in hue ΔE as being similar to an arithmetical mean value of the amounts of change in hue ΔE of the respective inks as compared to Reference Examples 1 and 4 in which these inks were respectively used solely.

INDUSTRIAL APPLICABILITY

In accordance with the ink set for ink-jet printing and the ink-jet printing method using the ink set according to the present invention, it is possible to obtain a printed material that exhibits a less change in hue of an image region containing a red-based pigment and a yellow pigment and is therefore excellent in weathering resistance even when used in the outdoor applications.

The invention claimed is:

1. An ink set for ink-jet printing, comprising at least a water-based ink (I) and a water-based ink (II), in which:
- the water-based ink (I) comprises a pigment (A1) having a barbituric acid-derived structure; and
- the water-based ink (II) comprises a diketopyrrolopyrrole pigment (A2),
- wherein the pigment (A1) is C.I. Pigment Yellow 150, and the pigment (A2) is C.I. Pigment Red 254,
- each of the water-based ink (I) and the water-based ink (II) further comprises a water-soluble organic solvent,
- the water-soluble organic solvent in each of the water-based ink (I) and the water-based ink (II) is not less than 35% by mass and less than 50% by mass.

2. The ink set for ink-jet printing according to claim 1, wherein a mass ratio of the pigment (A1) to the pigment (A2) [(A1)/(A2)] which are compounded in the water-based ink (I) and the water-based ink (II), respectively, is not less than 10/90 and not more than 90/10.

3. The ink set for ink-jet printing according to claim 1, wherein the pigment (A1) and the pigment (A2) are dispersed in the water-based ink (I) and the water-based ink (II), respectively, with a polymer (B).

4. The ink set for ink-jet printing according to claim 3, wherein the pigment (A1) in the water-based ink (I) and the pigment (A2) in the water-based ink (II) are respectively in the form of pigment-containing polymer (B) particles, and a crosslinking structure is introduced into the polymer (B) constituting the pigment-containing polymer (B) particles.

5. The ink set for ink-jet printing according to claim 3, wherein the polymer (B) is an aromatic group-containing polymer.

6. The ink set for ink-jet printing according to claim 3, wherein a mass ratio of the pigment to the polymer (B) [pigment/polymer (B] in each of the water-based ink (I) and the water-based ink (II) is not less than 30/70 and not more than 90/10.

7. The ink set for ink-jet printing according to claim 1, wherein the ink set is used for forming an image comprising an image region comprising the pigment (A1) and the pigment (A2) and showing a single hue.

8. The ink set for ink-jet printing according to claim 1, wherein the water-soluble organic solvent comprises at least one water-soluble organic solvent having a boiling point of not lower than 90° C., the water-soluble organic solvent is a polyhydric alcohol.

9. The ink set for ink-jet printing according to claim 8, wherein the polyhydric alcohol is at least one polyhydric alcohol selected from the group consisting of ethylene glycol, diethylene glycol, triethylene glycol, polyethylene glycol, propylene glycol, dipropylene glycol, polypropylene glycol, and glycerin.

10. The ink set for ink-jet printing according to claim 1, wherein the content of the pigment (A1) in the ink (I) or the content of the pigment (A2) in the ink (II) is not less than 3% by mass.

11. The ink set for ink-jet printing according to claim 3, the polymer (B) is a vinyl-based polymer obtained by addition-polymerizing a vinyl monomer.

12. The ink set for ink-jet printing according to claim 11, the vinyl-based polymer comprises a constitutional unit derived from an aromatic group-containing monomer (b-1) and a constitutional unit derived from an ionic functional group-containing monomer (b-2).

13. The ink set for ink-jet printing according to claim 12, the total content of the constitutional unit derived from the aromatic group-containing monomer (b-1) and the constitutional unit derived from the ionic functional group-containing monomer (b-2) in the polymer (B) is not less than 80% by mass.

14. The ink set for ink-jet printing according to claim 12, the mass ratio of the aromatic group-containing monomer (b-1) to the ionic functional group-containing monomer (b-2) [(b-1)/(b-2)] is not less than 0.5 and not more than 2.0.

15. The ink set for ink-jet printing according to claim 4, the polymer (B) is in the form of a polymer crosslinked with a crosslinking agent.

16. The ink set for ink-jet printing according to claim 15, the crosslinking agent is a polyglycidyl ether compound of a polyhydric alcohol containing a hydrocarbon group having not less than 3 and not more than 8 carbon atoms.

17. The ink set for ink-jet printing according to claim 3, wherein the pigment in the ink (I) or the ink (II) is in the form of pigment-containing polymer (B) particles, the average particle size of the pigment-containing polymer (B) particles in the ink is not less than 40 nm and not more than 150 nm.

18. An ink-jet printing method of loading the ink set for ink-jet printing according to claim 1 to an ink-jet printing apparatus to form characters or images on a printing medium, said method comprising the following steps 1 and 2:

Step 1: ejecting at least one of the ink (I) and the ink (II) onto the printing medium; and Step 2: further ejecting the other of the ink (I) and the ink (II) onto the one of the ink (I) and the ink (II) previously ejected onto the printing medium in the step 1 in an overlapped manner.

* * * * *

UNITED STATES PATENT AND TRADEMARK OFFICE

CERTIFICATE OF CORRECTION

PATENT NO. : 11,242,466 B2
APPLICATION NO. : 16/756084
DATED : February 8, 2022
INVENTOR(S) : Egawa et al.

It is certified that error appears in the above-identified patent and that said Letters Patent is hereby corrected as shown below:

In the Specification

At Column 4, Lines 51-65, please change the equation as shown:

(1-1)

“ 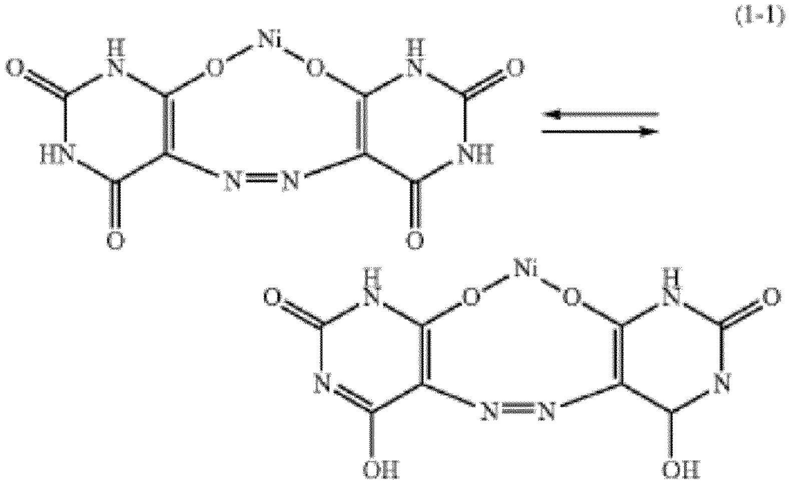 ”

To:

-- 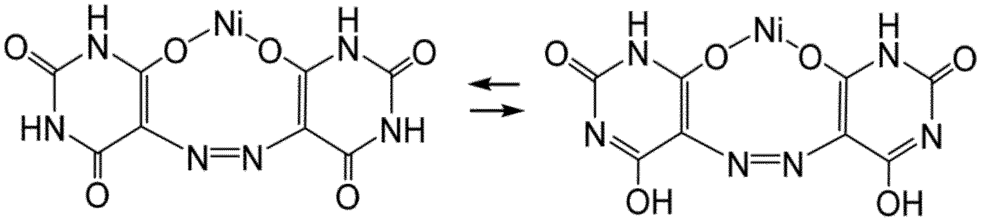 ( 1-1 ) --

Signed and Sealed this
Third Day of May, 2022

Katherine Kelly Vidal
*Director of the United States Patent and Trademark Office*